3,294,829
ZINC SALTS OF ALKYLENE-BIS-DITHIO-
CARBAMIC ACIDS
Hellmuth Lehmann, Wuppertal-Elberfeld, Ferdinand Grewe, Cologne-Stammheim, and Walter Lautenschlager, Wuppertal-Vohwinkel, Germany, assignors to Farbenfabriken Bayer Aktiengesellschaft, Leverkusen, Germany, a German corporation
No Drawing. Filed May 1, 1963, Ser. No. 277,107
Claims priority, application Germany, May 19, 1962,
F 36,848
6 Claims. (Cl. 260—429.9)

The present invention concerns novel zinc salts of bis-dithiocarbamic acid which exhibit particularly intensive fungicidal properties.

U.S. patent specification No. 2,317,765 has already described fungicidal agents which contain zinc ethylene-bis-dithiocarbamate as the active agent. In addition, the corresponding zinc salt of propylene-bis-dithiocarbamic acid is also known from Austrian patent specification No. 193,891 which is also suitable for the control of plant pathogenic fungi.

Finally, the published documents of South African patent application No. 60/5,125 refer to compounds with a fungicidal activity based upon those zinc ethylene-bis-dithiocarbamates whose ethylene bridge has been substituted once or twice by univalent aliphatic radicals. In accordance with the statements in the last mentioned publication the salt of ethyl-ethylene- as well as of 1,2-dimethyl-ethylene-bis-dithiocarbamic acid proves to be particularly effective in addition to the salt of propylene-bis-dithiocarbamic acid.

It has been found that zinc alkylene-bis-dithiocarbamates of the formula

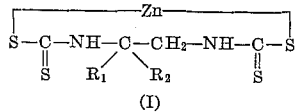

(I)

wherein $R_1$ and $R_2$ denote a univalent aliphatic radical, exhibit particularly good fungicidal properties.

In addition, it has been found that the zinc salts of bis-dithiocarbamic acid of Formula I, according to the invention, are obtained when alkylenediamines of the formula

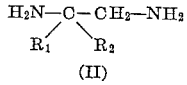

(II)

wherein $R_1$ and $R_2$ have the same significance as in Formula I, are reacted with carbon disulphide in the presence of a strong base, and the resultant soluble bis-dithiocarbamate is subsequently precipitated as the zinc salt by adding a solution of a zinc salt.

It must be regarded as distinctly surprising that the zinc salts of bis-dithiocarbamic acid according to the invention have an appreciably more marked activity towards plant damaging fungi than the chemically very similar zinc salts of bis-dithiocarbamic acid known from the present state of the art.

The agents in accordance with the invention exhibit a distinct superiority in respect of activity when compared with the zinc-ethyl-bis-dithiocarbamate known commercially as a fungicidal product of peak performance as well as with the zinc salts of propylene- and ethyl-ethylene-bis-dithiocarbamic acids described in the cited South African patent application No. 60/5,125, as is evident from the tables given below.

The diamines which can be employed for the process according to the invention are clearly characterized by Formula II. In this formula, $R_1$ and $R_2$ preferably represent lower alkyl radicals such as methyl, ethyl, propyl, as well as lower alkenyl radicals such as vinyl and allyl.

By way of examples for the compounds in accordance with the invention, mention may be made in detail of the zinc salts of the bis-dithiocarbamic acids of 1,1-dimethyl-ethylenediamine, of 1-methyl 1-ethyl-ethylenediamine, of 1,1 - diethyl - ethylenediamine, 1,1-dipropyl-ethylenediamine, and of 1-methyl 1-allylethylenediamine.

Aqueous solutions of alkali metal hydroxides, such as sodium hydroxide and potassium hydroxide, may for instance be employed as the strong bases for the execution of the process according to the invention, but also ammonium hydroxide. For precipitation, use is conveniently made of water-soluble zinc salts such as zinc chloride and zinc sulphate.

The zinc alkylene-bis-dithiocarbamates separate in an insoluble form and can readily be isolated from the reaction mixture by filtering them off.

The agents to be employed in accordance with the invention can, by virtue of their excellent fungicidal properties, be applied for the control of all those phytopathogenic fungi against which the above stated known active agents have hitherto been employed, i.e. particularly against *Phytophthora infestans, Cladosporium fulvum,* and *Alternaria solani* on tomatoes and potatoes. In addition, the products according to the invention can be applied with success against Peronospora (=*Plasmopara viticola*) on vines, *Venturia inaequalis* on stone fruit, as well as other disease causing fungi on various cultivated plants.

For this purpose, the application of the agents is carried out by a method known in principle, i.e. preferably in combination with suitable solid or liquid extenders or diluents. By way of solid carrier materials, chalk, silica gel, kieselguhr, talcum, bentonites, vermiculites, and the like are particularly suitable, whilst water is used especially as the diluent for the preparation of liquid compositions. However, since the relevant active agents are largely insoluble in water, it is convenient and sometimes even necessary for the preparation of aqueous dilutions previously to dissolve the active substance in a solubilizing auxiliary such as acetone or dimethylformamide, and then to dilute this preliminary mixture with water to give the concentration of active agent desired at any one time, with the aid of a commercial non-ionic emulsifying agent as well as, where necessary, with the concurrent use of bonding, wetting, or solid compounding agents. It is possible to apply the agents according to the invention in combination with other fungicides and/or insecticides.

The following examples explain the invention in detail:

(a) ESTIMATION OF THE FUNGICIDAL ACTIVITY UPON APPLICATION AGAINST *PHYTOPHTHORA INFESTANS* ON TOMATOES

Young tomato plants of the "Bonny Best" variety, in the four to five leaf stage, are sprayed with aqueous emulsions or suspensions of the products specified below. The plants are afterwards allowed to dry off during 24 hours, they are then sprayed superficially with a spore suspension of *Phytophthora infestans* and they are subsequently introduced into a humid chamber in which a relative air humidity of about 100% prevails. When the incubation period has elapsed, the fungus infection is estimated by evaluating the individual pinnules, classifying in grades from 0 (free from infection) to 5 (leaf infected throughout its entire area or destroyed) and expressing the extent of the infection as a percentage of the infection in the untreated control plants (=100).

((b) ESTIMATION OF THE FUNGICIDAL ACTIVITY UPON APPLICATION AGAINST PERONOSPORA (*PLASMOPARA VITICOLA*) ON VINES

Young potted vines of the Müller-Thurgau variety are inoculated with spores of *Plasmopara viticola* 24 hours after the application of each of the products specified below by a method analogous to that used in the case of the experiments with *Phytophthora infestans*. The evaluation of the test is carried out as described under (*a*).

The results obtained in the individual experimental series with the different test fungi are summarized below in the form of tables.

Fungicidal activity of the zinc 1,1-dimethyl-ethylene-bis-dithiocarbamate according to the invention compared with the corresponding known zinc ethylene-, propylene-, and the ethyl-ethylene-bis-dithiocarbamates.

TABLE 1
[Test fungus: *Phytophthora infestans* on tomatoes]

| Product | Concentration of active agent, as percent | Infection, as percent of the untreated control (=100) |
|---|---|---|
| [-S-C-NH-CH-CH$_2$-NH-C-S-]Zn (S, CH$_3$, S) | 0.0125 / 0.0031 | 6 / 26 |
| [-S-C-NH-CH-CH$_2$-NH-C-S-]Zn (S, C$_2$H$_5$, S) | 0.0125 / 0.0031 | 13 / 34 |
| [-S-C-NH-C-CH$_2$-NH-C-S-]Zn (S, CH$_3$/CH$_3$, S) | 0.0125 / 0.0031 | 1 / 9 |
| [-S-C-NH-CH$_2$-CH$_2$-NH-C-S-]Zn (S, S) | 0.0125 / 0.0031 | 36 / 59 |
| Control (untreated) | | 100 |

TABLE 2
[Test fungus: Peronospora (*Plasmopara viticola*) on vines]

| Product | Concentration of active agent, as percent | Infection, as percent of the untreated control (=100) |
|---|---|---|
| [-S-C-NH-CH-CH$_2$-NH-C-S-]Zn (S, CH$_3$, S) | 0.0062 / 0.00156 | 1 / 22 |
| [-S-C-NH-CH-CH$_2$-NH-C-S-]Zn (S, C$_2$H$_5$, S) | 0.0062 / 0.00156 | 2 / 22 |
| [-S-C-NH-C-CH$_2$-NH-C-S-]Zn (S, CH$_3$/CH$_3$, S) | 0.0062 / 0.00156 | 0 / 0 |
| [-S-C-NH-CH$_2$-CH$_2$-NH-C-S-]Zn (S, S) | 0.0062 / 0.00156 | 8 / 50 |
| Control (untreated) | | 100 |

*Example 1*

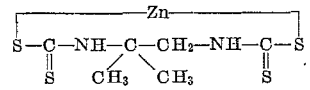

19 g. of carbon disulphide are added dropwise to a mixture of 250 ml. water and 52 g. of 1,2-diamino-1,1-dimethyl ethane. The temperature is about 25–30°. The reaction mixture is agitated until a pH value of about 7–8 is reached. The temperature is raised to about 38–40° and aqueous sodium hydroxide solution (or an aqueous ammonia solution) is added dropwise. Care must be taken that the pH value does not exceed 10. In about 9 hours there are used up about 26 g. of a 46% aqueous hydroxide solution (or 20 g. of a 25% aqueous ammonia solution). The mixture thus obtained is filtered and the carbon disulphide still unreacted is separated in a separating funnel. 110 g. of an aqueous zinc sulphate solution (or a zinc chloride solution) with a content of 7.5% of zinc is dropped into the clear filtrate within about 2 hours at a temperature of about 25–30°. A solid mass which separates is filtered off and washed with water until no sulphate ions (or chloride ions) can be detected any more. The product is dried at room temperature.

Yield: 41 g. of zinc-1,1-dimethyl-ethylene-bis-(dithiocarbamate).

*Analysis.*—Calculated: C, 23.75; H, 3.30; N, 9.25; S, 42.30; Zn, 21.30. Found: C, 22.12; H, 4.06; N, 10.03; S, 42.79; Zn, 22.75.

We claim:
1. Zinc alkylene-bis-dithiocarbamates of the formula

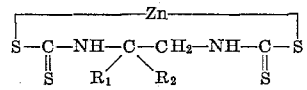

wherein $R_1$ and $R_2$ are members selected from the group consisting of lower alkyl and lower alkenyl.
2. Zinc 1,1-dimethyl ethylene-bis-dithiocarbamate.
3. Zinc 1,1-diethyl ethylene-bis-dithiocarbamate.
4. Zinc 1-methyl 1-ethyl ethylene-bis-dithiocarbamate.
5. Zinc 1,1-dipropyl ethylene-bis-dithiocarbamate.
6. Zinc 1-methyl 1-allyl ethylene-bis-dithiocarbamate.

References Cited by the Examiner

UNITED STATES PATENTS 3,178,336    4/1965    Mugno _____ 167—22

FOREIGN PATENTS 234,970    6/1959    Australia.

HELEN M. McCARTHY, *Acting Primary Examiner.*
TOBIAS E. LEVOW, *Examiner.*
E. C. BARTLETT, H. M. S. SNEED,
*Assistant Examiners.*